Patented Sept. 30, 1924.

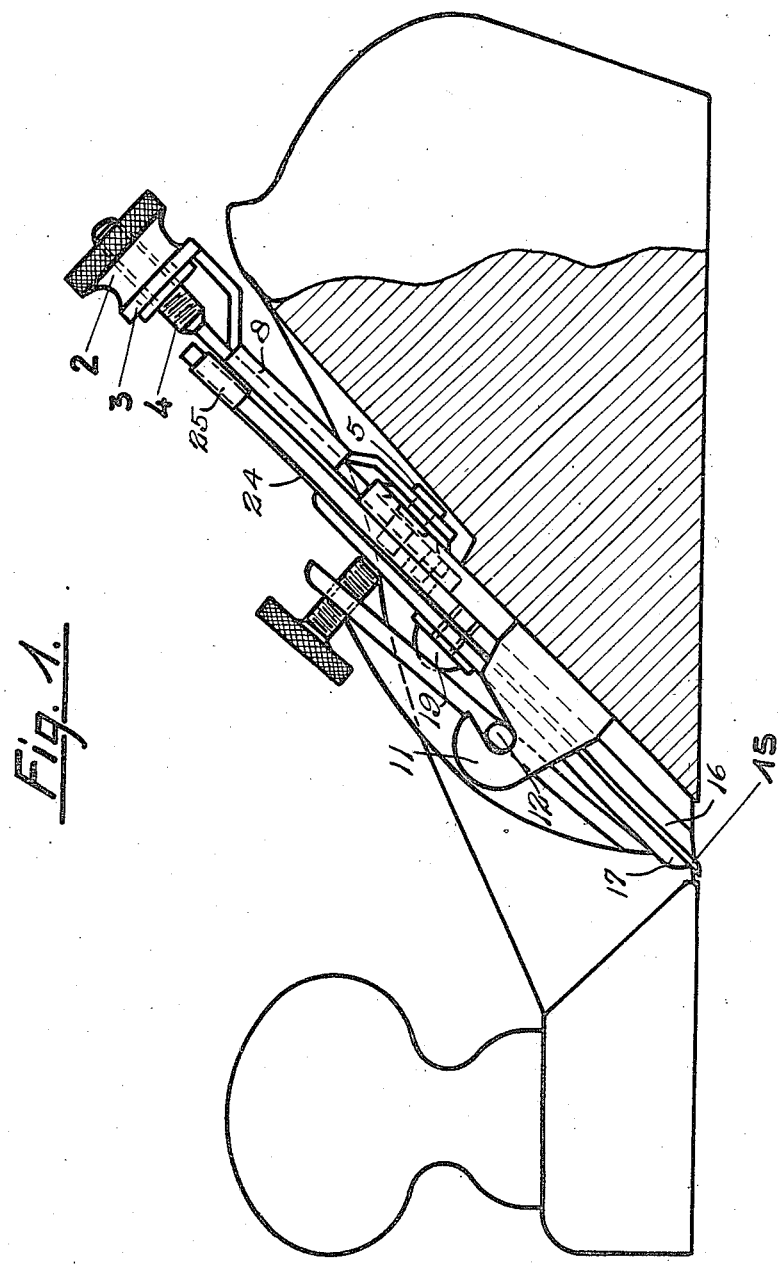

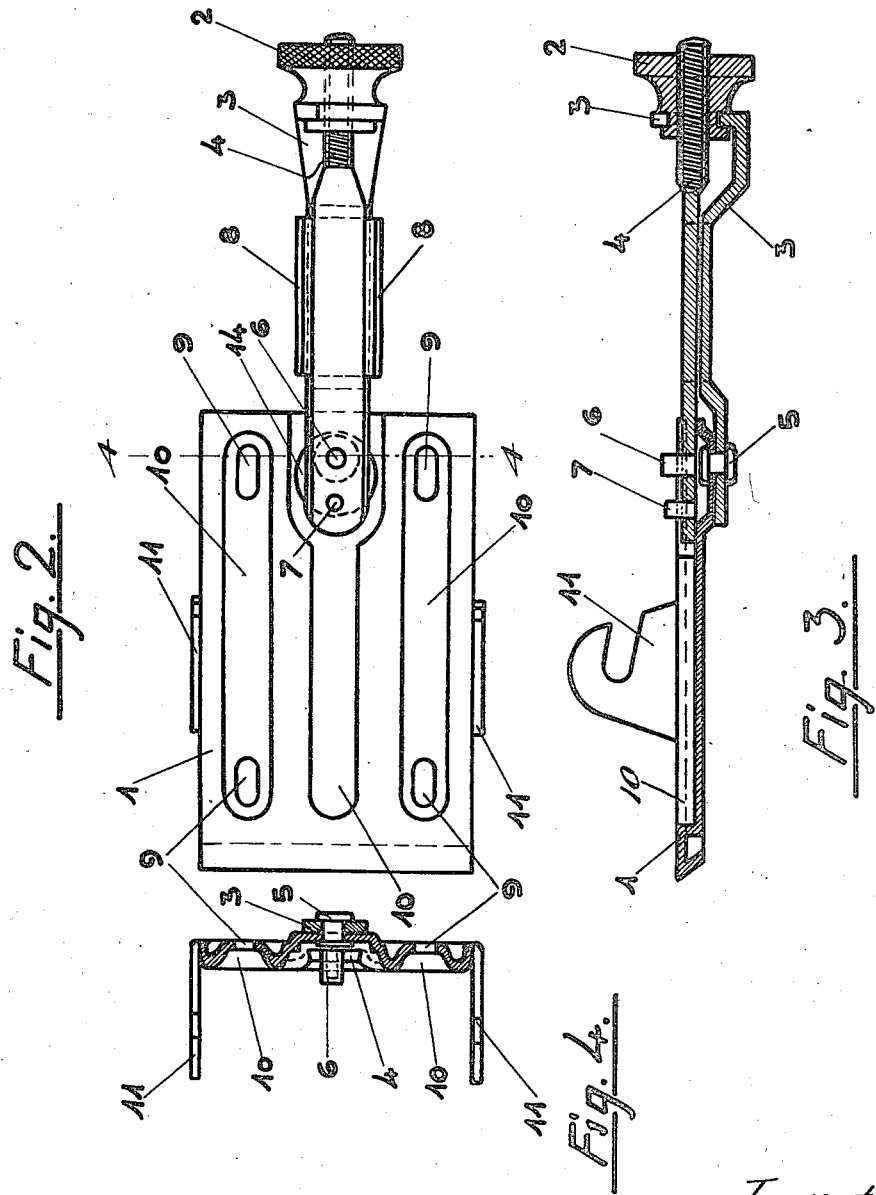

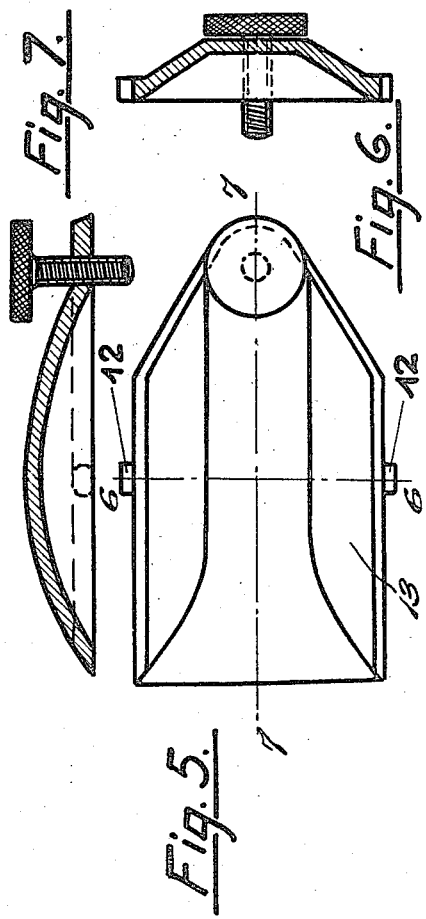
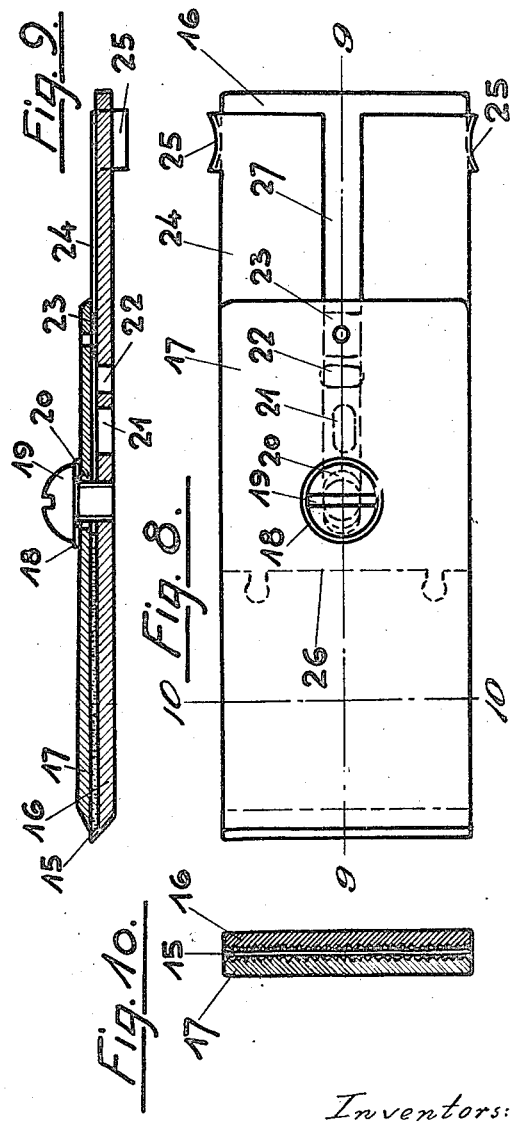

1,510,295

UNITED STATES PATENT OFFICE.

YRJÖ AUGUST BRANDER AND GEORG S. GYLLENBERG, OF TAMPERE, FINLAND.

HAND PLANE.

Application filed December 29, 1923. Serial No. 683,421.

*To all whom it may concern:*

Be it known that we, YRJÖ AUGUST BRANDER and GEORG SIXTEN GYLLENBERG, a citizen of the Republic of Finland and a subject of the King of Sweden, respectively, residing at Tampere, Finland, have invented certain new and useful Improvements in Hand Planes, of which the following is a specification.

The invention relates to hand planes and has for its object to provide thin planing blades that can be easily removed and quickly sharpened. The invention has for a further object to provide a blade, which at the inner end is thinner than at the outer end and is pressed between two blade holders, so that the blade will be firmly grasped by the holders in the manner of a wedge, the entrance of wood shavings between the blade and the holders being prevented.

A still further object of the invention is to provide a blade that during the work may be easily adjusted longitudinally of the planing tool as well as transversely thereof, so that during the work the depth of the cut may be altered as well as the lateral positions of the blade.

The invention will now be described by reference to the preferred embodiment illustrated in the accompanying drawings, whereon:

Fig. 1 shows the complete hand plane, partly in section,

Fig. 2 is a top plan view of the lower blade support with the hand lever and screw button.

Fig. 3 is a central longitudinal section through Fig. 2.

Fig. 4 is a cross section along the line 4—4 of Fig. 2.

Fig. 5 is a top plan view of the upper blade support.

Fig. 6 is a cross section along the line 6—6 of Fig. 5.

Fig. 7 is a longitudinal section along the line 7—7 of Fig. 5.

Fig. 8 is a top plan view of the blade and blade holders.

Fig. 9 is a longitudinal section along the line 9—9 of Fig. 8.

Fig. 10 is a cross section along the line 10—10 of Fig. 8.

The lower blade support comprises a plate 1, adapted to be fixed to the plane, and, as shown in Figs. 2 to 4, having two upwardly bent strips or ears 11, which ears are formed with slots by means of which plate 13 of the upper blade support (Figs. 5 to 7) is attached, the lugs 12 of the upper support plate going into said slots. In order to increase the strength of the lower support plate 1 there are pressed in it three longitudinal grooves 10. One end of the central longitudinal groove 10 is further depressed to form a recess 14 which receives one head of a rivet 5 serving as pivot for a lever 3. The right hand end of the lever 3 (Figs. 2 and 3) spans a knurled nut 2, which engages the round screw threaded end of a flat bar 4, provided with upstanding studs 6 and 7. When the nut 2 is turned, the bar 4 will move longitudinally, being guided by the upwardly bent edges 8 of the lever 3. The stud 6 engages a hole 22 in the lower blade holder 16, (Fig. 9) and the blade 15 with its two holders 16 and 17 will follow the longitudinal movements of the stud 6 on bar 4. If the lever 3 be swung to either side about the pivot 5, the stud 7 carried by bar 4 is shifted in the other direction; this stud 7 engages in hole 21 of the lower blade holder 16, and will cause the latter, with the blade 15, to move sideways. The longitudinal movement and the side movement of the blade are thus obtained by manipulation of the same nut 2, by either turning it or pushing it sideways.

The lower blade support plate 1 (Fig. 2) is fixed to the body of the plane by means of screws passing through the holes 9, which are preferably elongated to enable the support to be adjusted. The blade holders 16 and 17 with the blade 15 will be located between the two blade supports 1 and 13, the lugs 12 of the upper support 13 engaging in the slots of the ears 11 of the lower support, while the lower end (in Figs. 5 and 7, the left hand end) of the upper support 13 is pressed against the upper blade holder 17 by means of a screw in the upper end of the support 13, which is fulcrumed on the lugs 12.

The blade and blade holders are shown in Figs. 8 to 10. In Fig. 9, the planing blade 15 is made of a thin steel plate and is thinner at the upper end than at the lower cutting end. This blade, which may have any suitable length, is connected to the blade plate or extension 24 in any suitable way, for instance by providing the connecting edges with undercut recesses and overhanging projections as shown by the dotted lines 26 (Fig. 8). In plate 24 there is a longitudinal slot 27, engaging with the square element 23 which is riveted to the upper blade holder 17. The screw 19 surrounded by a compression washer 18 presses the two blade holders 16 and 17 and the blade 15 firmly together, the screw threads being in the lower blade holder 16, while the hole 20 in the upper blade holder is elongated to allow the upper holder to be moved somewhat longitudinally of the lower holder. The surfaces of the holders 16 and 17 that contact with the blade 15 may be roughened or toothed in order to keep the blade 15 more firmly in position, but the toothed or roughened areas do not extend to the lower edge, and thus wood shavings and dust can not enter between the blade and the holders. A further purpose of providing the toothed or roughened surfaces of the two holders is to prevent dust from weakening the grip that the holders exert on the blade, such weakening being possible of occurrence if the contacting surfaces were perfectly flat and there were dust on them before tightening up the screw 19. When the surfaces are toothed or roughened, any dust present lodges itself in the spaces between the teeth or projections. As the blade 15 and its extension 24 are thicker at the lower end than at the upper, the blade will be gripped between the two holders. The plate or extension 24 at its upper end is provided with the bent strips or ears 25 which are intended partly to guide the blade and plate when the blade is adjusted between the tool holders, and partly to provide finger holds by means of which the adjusting of the tool can be effected.

We claim as our invention:

1. In a hand plane, the combination of connected upper and lower blade-supporting elements; a movable blade-holding device interposed therebetween; a blade in said device; a lever pivoted to one of said plates for lateral swinging movement; a rotatable nut loosely connected to said lever; and an operating bar for the holding device connected both to the same and to said lever and said nut, to selectively move sidewise with the lever during the swinging movement thereof or endwise relatively to said lever when the nut is rotated, said bar carrying the holding device with it during both such movements.

2. In a hand plane, the combination of connected upper and lower blade-supporting elements; a movable blade-holding device interposed therebetween; a blade in said device; a lever pivoted to one of said plates for lateral swinging movement; an operating element for the holding device connected to said lever to move therewith and thereby shift said device sidewise; and a member on said lever connected to move said operating element and holding device endwise independently of and relatively to the lever.

3. In a hand plane, the combination of connected upper and lower blade-supporting elements; a movable blade-holding device interposed therebetween; a blade in said device; a lever pivoted to one of said plates for lateral swinging movement; an operating element for the holding device connected to said lever to move therewith and thereby shift said device sidewise, said element having a threaded end; and a nut loosely carried by said lever and rotatably mounted on the threaded end of said operating element to move the latter and the holding device endwise independently of and relatively to the lever.

4. A hand plane, according to claim 1, in which the operating bar is connected at its front end to the holding device and at its rear end to the rotatable nut, and is engaged intermediate its ends with the lever.

5. In a hand plane, the combination of connected upper and lower blade-supporting elements; a movable blade holder interposed therebetween; a blade mounted in said holder to follow its movements; an operating bar connected at one end to the holder and having its other end threaded; a nut rotatably mounted on the threaded end of the bar to move the latter and the holder endwise when the nut is rotated; and a member connected to swing said bar and holder laterally and having means for holding said nut against endwise movement when rotated.

In testimony whereof we affix our signatures.

G. S. GYLLENBERG.
YRJÖ AUGUST BRANDER.

In the presence of:—
LEA ASPELIN,
ESTER LILJEBLAD.